United States Patent [19]

Hawkes et al.

[11] Patent Number: 4,913,922

[45] Date of Patent: Apr. 3, 1990

[54] METHOD FOR TREATMENT OF COOKING OIL

[75] Inventors: Ralph O. Hawkes; Charles E. Silverblatt, both of Salt Lake City, Utah

[73] Assignee: Peregrine International Associates, Inc., Salt Lake City, Utah

[21] Appl. No.: 239,438

[22] Filed: Sep. 1, 1988

[51] Int. Cl.[4] ................................................. C11B 3/00
[52] U.S. Cl. ..................................... 426/417; 426/429; 426/438
[58] Field of Search .................... 426/417, 438, 429

[56] References Cited

U.S. PATENT DOCUMENTS

| | | | |
|---|---|---|---|
| 3,231,390 | 1/1966 | Hoover | 426/417 |
| 3,947,602 | 3/1976 | Clewell et al. | 426/417 |
| 4,735,815 | 5/1988 | Taylor et al. | 426/417 |
| 4,764,384 | 8/1988 | Gyann | 426/417 |

Primary Examiner—Marianne Cintins
Assistant Examiner—Celine T. Callahan
Attorney, Agent, or Firm—Robert R. Finch

[57] ABSTRACT

A method and apparatus arrangement for continuous cooking of food in hot oil with clarification, purification and recycle of oil. Particulates-laden oil from the cooker is passed through a comminutor then through a precoat filter to remove particulates. The filter bed may also contain a quantity of adsorbent to remove free fatty acid from the oil before reuse. Elevated temperatures are maintained and the operation is conducted in an oxygen-poor environment. An apparatus arrangement includes a cooker, a comminutor and an enclosed precoat filter through which all oil passes. Appropriate piping and controls are provided.

4 Claims, 4 Drawing Sheets

METHOD FOR TREATMENT OF COOKING OIL

FIELD OF INVENTION

This invention relates generally to frying food in deep cooking oil. More particularly, the invention relates to improved methods for handling the oil and specifically to the provision of ways and means for its continuous clarification and conditioning thereby to clarify the oil and to control the amount of free fatty acid and other contaminants therein all to the end that cooking oil not actually carried away with product may be reused indefinitely thereby virtually eliminating replacement of off-specification oil as a cost of operation.

BACKGROUND OF INVENTION

Many foods are commercially processed by dipping in a batter and breading followed by cooking in a hot oil bath at suitable temperatures of, say, 360° F. to 380° F. Foods thus prepared are consumed on site or packaged, as by freezing, for distribution.

During use, the oil becomes contaminated by particulates derived from the food, batter and breading as well as by soluble free fatty acids and color bodies. Free fatty acids are continuously produced by breakdown of organic particulates in the hot oil. Since the oil remains hot, particulates allowed to remain therein continue to pyrolize and/or oxidize thus continue the build up of free fatty acids, off-tastes and undesirable color. Free fatty acids as noxious fumes also cause burning of eyes of persons in the frying area.

All of the above problems can be solved, to a degree, by frequent dumping and total or partial replacement of the oil, however, that is very costly because the used oil can be sold only for salvage value for other uses. New oil, besides being expensive, must be reheated which increases its cost. Moreover, even with frequent replacement, the cooker conditions are not constant, but continuously worsen from the time new oil is added until it is dumped.

In prior operation, particulates are removed by screening and crude filtration. This is costly because screening is slow and the resulting solids waste has associated with it much oil that is simply lost. Furthermore, not all particulates are removed, consequently the build up of finer particulates continues with resultant degradation of oil until it must be dumped. In some prior operations, coarse solids are removed by screening or decantation then the resulting partially cleaned oil is subjected to pressure filtration. Again, this is a slow batch type operation.

In accordance with prior practice, removal of free fatty acids is accomplished by mixing the oil with a suitable adsorbent long enough to effect acid removal. This usually requires considerable time, from as low as 20 minutes to an hour or more, during which the oil cools and is out of use. This adds to tankage and oil inventory requirements. It also causes the consumption of extra energy for reheating.

Color removal is effected, independently of free fatty acid control, by suitable treatment of the oil.

From the foregoing it is apparent that significant savings in labor and material will be realized if the cooker oil can be continuously maintained at a constant condition of clarity and acceptable free fatty acid content without unnecessary cooling or loss of significant quantities of oil in waste particulates.

SUMMARY AND BRIEF DESCRIPTION OF INVENTION

The primary object of the present invention is the provision, in deep oil cooking of foods, of ways and means to continuously clarify and condition the cooking oil thereby to maintain uniformly acceptable cooking conditions at all times thereby to yield a product of uniformly high quality.

An important object is to provide an economic means of re-using cooking oil that eliminates the need to "dump" oil, avoids hot sloppy wastes and produces a dry waste product with potential for other use.

A related object is provision of ways and means whereby the solids content of the cooking oil discharged from the cooker enables continuous vacuum filtration of the oil to yield a clear clarified oil that is prepared for treatment to control free fatty acid and then for reuse, all without taking the oil out of service for treatment or allowing it to cool so much that it violates health requirements (about 160° F. minimum), which will require it to be discarded; or needs a lot of reheating which costs money.

Another object, in combination with the foregoing objects, is provision of ways and means for in-situ control of the free fatty acid content of the oil by contact with an adsorbent during its flow through a specific mixed material precoat filter bed thereby avoiding the need to hold oil in a reaction-mixing stage.

The foregoing and probably other objects of the invention are achieved by a combination of steps which include continuously subjecting all of the dirty oil (including particulates) leaving the cooker to comminution as by shearing, chopping or other technique to reduce the particulates to relatively small size; then filtering the resulting mix of oil and particulates on a precoat filter bed formed primarily from diatamaceous earth where the comminuted solids apparently act as a unique filter aid for the finer particles thereby enabling continuous filtration at a practical rate which, except for the comminution, could not be achieved. Thus, by the specific step of reducing the size of the coarser particulates in the oil, continuous precoat filtration at a practical rate is rendered possible.

The oil bath is everchanging, but its volume and level in the cooker is maintained constant by the continuous addition thereto of clear oil at a rate to make up for the total of oil removed therefrom in the mixture of oil and particulates and that oil lost with the cooked food. The result is that the oil bath in the cooker is of constant volume and level, but is nonetheless everchanging to maintain proper conditions.

Comminution of the coarse particulates also virtually eliminates the danger of plugging of conduits or setting up of settled particulates in the event of inadvertent interruption of flow between the comminutor and filter or in the filter vat.

Upon filtration, the particulates will deposit on the bed surface leaving only a clear oil with dissolved impurities, primarily free fatty acids and super-fine color bodies, to flow through the bed. Early particulate removal is important. This is so, because it immediately stops further release of free fatty acid from breakdown of organic particulates.

Once the particulates are separated out, the major source of additional free fatty acid is gone and the clear oil filtrate is now ready for removal of existing dissolved free fatty acid. In accordance with the basic invention this may be accomplished by prolonged mixing of oil with a suitable adsorbent in a holding vessel or, in accordance with an important modification of the invention, by flowing through a filter bed containing adsorbent which may be a synthetic calcium silicate.

For prolonged mixing, the adsorbent and oil ratio will be about 98% oil to 2% adsorbent. Mixing time will be from 20 minutes to a few hours depending on the initial acid content and desired degree of removal. The resulting reacted mixture is then separated on the filter and the oil returned to process. When treated this way the oil is purified to a free fatty acid content below the established limit then used to adjust the other oil. Thus, in accordance with the basic invention, efficient removal of particulates is accomplished which in turn enhances free fatty acid control using the prolonged mixing technique. An important feature of our method is that we treat oil while it is at about cooking temperature rather than deliberately cooling it as in prior practice. This effects savings in heat (both fuel and equipment) and time. Also, it obviates the need for tankage to hold oil during treatment.

An important specific embodiment of the invention provides for free fatty acid control by establishing and maintaining a specific adsorbent-bearing mixed filter bed and pulling the clarified oil through such bed. This is based on our discovery that once the particulates are removed the clear oil is so reactive with finely divided adsorbent that the adsorbent may be concentrated in a porous layer, such as a bed on a filter, then the clarified oil flowed therethrough whereupon the adsorbent picks up free fatty acid from the moving oil. The action is rapid because the oil goes through the bed in a few seconds. This is virtually a stand alone feature. In its broadest application, all that is needed is that the oil be substantially particulates-free to flow through the adsorbent-bearing layer. The particulates may be removed on the surface of the layer, as they would be if the layer is part of a filter, or they may be removed by other means.

If proper filtration is to be practiced, a proper basic precoat bed is an absolute requirement. There must first be applied to the filter drum surface a sealing heel which is simply a layer of precoat material. Diatamaceous earth is a well known basic material, but others may be used. The basic heel must be at least $\frac{1}{4}''$ to $\frac{1}{2}''$ thick. If fatty acid adsorbent is mixed with oil in a separate vessel for subsequent separation on a pure diatamaceous earth precoat bed then the precoat may be built up to 2" to $2\frac{1}{2}''$ whereupon standard filtration and cake shaving will be conducted.

On the other hand, if the adsorbent is to be incorporated into the filter bed, then a $\frac{1}{4}''$ to $\frac{1}{2}''$ sealing heel of pure diatomaceous earth or other precoat will suffice and a mixture of adsorbent and precoat will be built up on top of that to a final depth of $2\frac{1}{2}$–3 inches or so.

The bed structure is critical and care must be taken in its preparation. The precoat sealing heel must be capable of filtering out the particulates from the cooker oil. Additionally, and this is important, the sealing heel must be capable of filtering out finer fatty acid adsorbent material because if the latter escapes through the bed into the clarified oil filtrate it causes foaming which can result in shutdown.

It is a further requirement that the proportion of adsorbent in the mixed bed not be too great lest it blind the bed and cause significant loss in filtration rate. Yet, there must be sufficient adsorbent present in the bed to adsorb the free fatty acid as the oil passes therethrough. We have obtained good performance from a bed comprising a $\frac{1}{4}''$–$\frac{1}{2}''$ heel of pure diatamaceous earth overlain by a $2\frac{1}{2}''$–3" mixed bed that contains at least about 75% diatamaceous earth and up to 25% by weight of synthetic calcium silicate. Obviously, as with any process using variables, the optimum ratios, bed depths and other conditions may be determined empirically. This is satisfactory so long as the requirements are met that there be a sealing heel (to block passage of adsorbent) overlain by a mixed bed that filters particulates and provides adsorbent to pick up free fatty acid from the clarified oil as it flows through the mixed bed.

As the drum rotates, the particulates build up on the bed surface and they, along with a small amount of the underlying precoat bed are shaved off by the advancing scraper blade in accordance with standard practice.

The rapidity of adsorbent action in the precoat bed is remarkable. Any given drop of oil will flow through the precoat bed and thus complete its entire contact with the adsorbent in a matter of seconds. It should be noted that the oil will follow a tortuous path through the bed which maximizes its contact with the fine individual adsorbent particles. In contrast, when a mixed precoat is not used, control of free fatty acid requires that the particulates and oil be mixed with adsorbent for prolonged periods from 20 minutes to an hour or more to achieve free fatty acid removal. Then, after the prolonged mixing, the oil and solids must still be separated. This was usually done by pressure filtration which is slow and costly.

Thus, in accordance with this modification of the invention, the precoat bed is formulated to control, and adjust if necessary, the free fatty acid content of the oil as it flows through the concentrated adsorbent bed on the filter.

The resulting filtrate is clarified oil of quality to be used alone or mixed with new make-up oil for use as needed in the cooker.

The entire cooking and clarification operation is conducted at elevated temperatures (300° F. to 380° F.) at which the particulates and oil may, under certain conditions, burn. In usual filtration practice large volumes of air (oxygen) are drawn through the precoat bed. This favors and may indeed induce combustion on and in the bed. Also, oxidizable particulates are concentrated as a cake on the bed surface and, in an oxygen-rich atmosphere, may break into flames. Undesirable oxidation and burning are controlled, in accordance with another feature of the invention, by means which provide for filtration and subsequent cake disposal to be conducted in an atmosphere high in inert gases which may, but need not be, $CO_2$ in which oxygen is maintained well below 10%, usually about 6%. This is achieved by hooding the filter to provide a closed filtration system, then injecting $CO_2$ under the hood as needed. Gas under the hood is drawn through the cake to the vacuum pump and from the pump back to the hood. Fresh $CO_2$ is injected as needed to maintain a blanket of $CO_2$-rich gas over the filter bed and the discharged solids to prevent flashing or spontaneous combustion. The preferred embodiment of the invention provides for continuous monitoring of the oxygen concentration under the hood and for automatic injection of additional $CO_2$ whenever the oxygen concentration exceeds about 6%. This will accomodate inadvertent heat bumps which might otherwise cause excessive oxidation. Also, an oxygen-poor system can run at higher oil temperatures which enhances filtration.

As noted, the key to successful filtration of the cooker discharge oil is to subject to comminutiuon the entire volume of the oil and particulates mix exiting the cooker. Without such comminution, the solids haphazardly blind the bed. Moreover, the coarse solids from the cooker, which may exceed ¼" (6.35 mm) in diameter hence cannot be kept in suspension for filtration, will collect in the bottom of the filter vat where they often accumulate to a depth that causes scouring of the surface of the precoat bed thus making filtration virtually impossible. In this invention the key to fatty acid control lies first in the ability of the filter to effect immediate removal of particulates and, in a particular modification hereof, the resulting ability to use a concentration of free fatty acid adsorbent in the precoat bed for continuous acid control.

During cooking, free fatty acids will, unless controlled, build up in the oil. Governmental authorities and users set maximum acid standards which the users must meet. User-set standards are often stricter than government standards. Illustratively, one user imposes a maximum of 1% free fatty acid in the oil. For the same service, the USDA will permit up to 2%.

The free fatty acid content of the oil is regularly monitored. If adjustment is anticipated the precoat bed is, upon next renewal or by addition thereto, adjusted so that at least the outer portion of the bed itself will contain as a constituent a free fatty acid adsorbent in an amount not exceeding about 25% of the bed. The precoat bed will always contain at least 75% usual diatamaceous earth and the balance will be a free fatty acid adsorbent. By continued monitoring free fatty acid content, the proper bed mix ratio will be determined empirically. Thereafter, the precoat bed will be maintained at that ratio. This achieves the goal of free fatty acid control yet eliminates the need for prolonged mixing and subsequent separation which require extra tankage and special equipment, take oil out of use, consume energy for mixing and cause unnecessary heat loss.

This invention provides a continuous oil handling technique for use in deep oil frying operations, whereby cooking oil is maintained at a uniform high quality indefinitely. The technique differs markedly from the prior batch operation wherein the quality of the oil inventory continuously degrades from the time of new oil addition to the dumping of old oil. In prior practice, large quantities of oil are simply thrown out with the coarse solids after their crude separation from the oil leaving the cooker. In contrast, this invention separates almost all oil from particulates (solids), and vice versa, before discarding any solids thus eliminating solids as a significant cause of oil loss. The oil is completely clarified (all solids removed) to a clear filtrate and free fatty acid is simultaneously controlled. The invention thereby provides the oil with virtually unlimited life; and oil loss is limited to the modest amounts held in the relatively dry discharged filter cake and in the cooked product.

DETAILED DESCRIPTION OF INVENTION

In order that the invention may be more readily understood and carried into effect, reference is made to the accompanying drawings and description thereof which are offered by way of example only and not in limitation of the invention the scope of which is defined by the appended claims and equivalents embraced therein rather than by any mere description. In the drawings:

Figure 1:
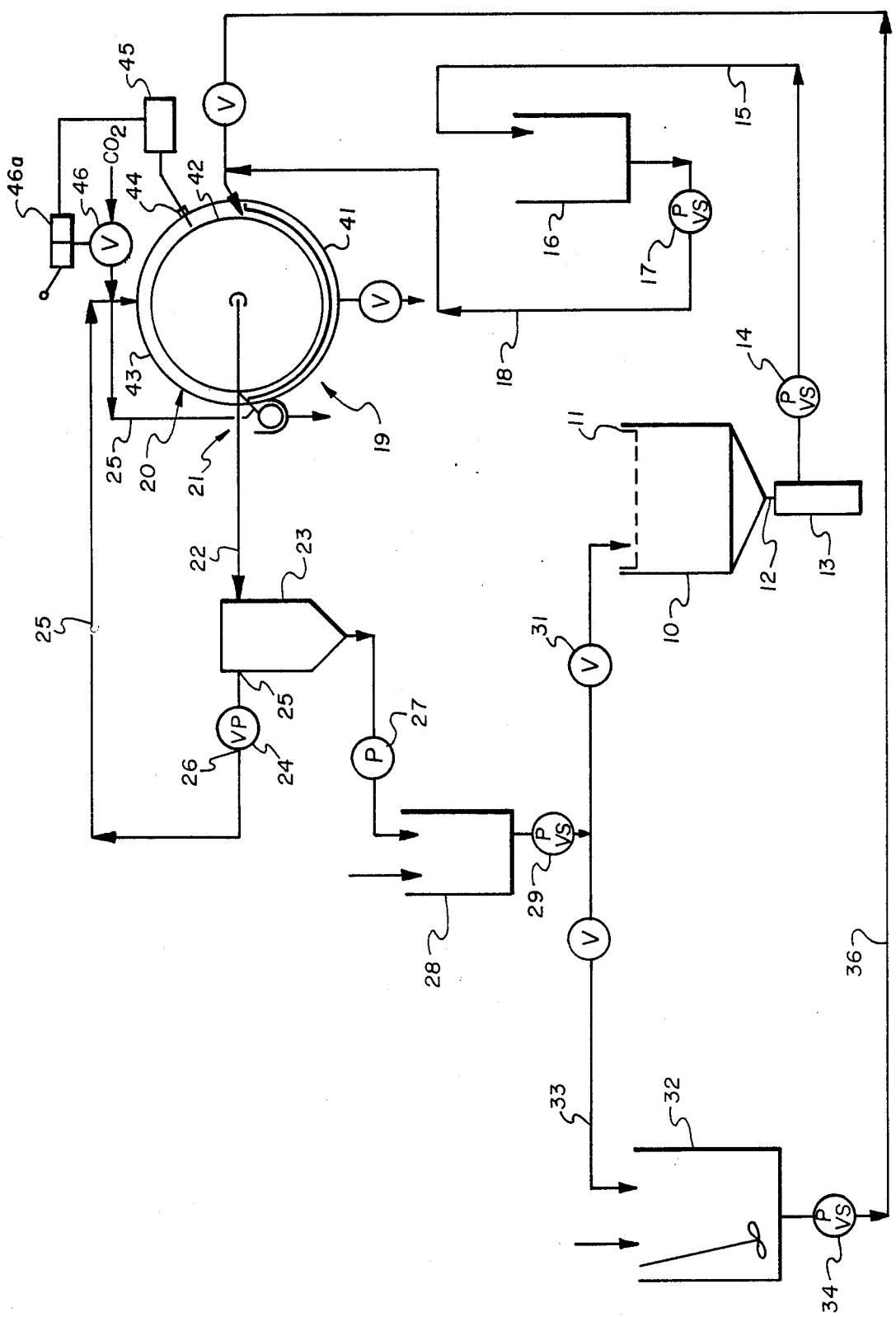
FIG. 1 is a line diagram illustrating a system incorporating a preferred embodiment of the invention.

The system is designed to service a deep oil cooker tank 10 which includes usual submerged heating elements (not shown) and is provided with a suitable basket 11 for holding food to be cooked. (In practice, a moving belt is usually employed to carry food into submergence in the oil, hold it there until cooked then remove, drain and carry it to further processing).

The cooker is provided with a bottom outlet 12 through which a mixture of oil and particulates is withdrawn. All of the withdrawn material passes immediately through a comminutor 13, then via a suitable variable rate pump 14 through a suitable conduit 15 to a dirty oil storage tank 16 whence it is transported by a usual pump 17 and conduit 18 to a rotary drum vacuum precoat filter station, generally designated 19, for clarification and; in one embodiment of the invention, for free fatty acid removal.

The cooker is provided with a drag conveyor adjacent its bottom. The conveyor, which is not shown in the drawings, may be of any conventional design adapted to move particulates continuously toward the outlet and comminutor thus to prevent coarse solids from settling on the cooker bottom or in any conduit.

In the filter station, particulates are removed on the filter 20 and separated as a cake that is discharged at an outlet 21, while a filtrate of clear oil is removed via a conduit 22 into a vacuum receiver 23 under the influence of vacuum applied by a vacuum pump 24 connected by a gas outlet conduit 25 on the receiver which conduit carries on from the vacuum pump outlet back to the filter station hood.

In the receiver, oil is separated from the gas, the latter being recycled through the outlet 26 of the vacuum pump back to the hood in the filter station while the clear filtrate is conducted by a pump 27 and associated conduit to a clarified or clear oil storage tank 28.

Clarified oil in the tank 28 is ready for reuse in the cooker. New oil as needed to make up for oil lost from the cooker with the cooked food and with the filter cake is conveniently added to the clarified oil storage then to the cooker via a suitable pump 29 and valve 31.

So far as system operation is concerned new oil and clarified oil are equivalent except that new oil needs heating while recycled oil may already contain some color bodies.

For initial precoating of the filter and for adding additional precoat bed materials, a separate mix tank 32 is provided into which clear oil is supplied by a valved conduit 33.

A suitable precoat pump 34 and conduit 36 are provided to conduct the proper filter material to the filter as needed for precoating and free fatty acid control.

The rotary drum vacuum filter 20 is of known design. It includes a vat 41 in which the mix of oil and comminuted particulates is received and kept in suspension by a suitable internal agitator. A horizontal drum 42 is journalled at its opposite ends and known mechanisms are provided to effect drum rotation in the vat. Vacuum from the pump 24 is applied through the drum interior to beneath its surface in known manner.

In order to control the oxidation conditions in and near the filter a hood 43 is provided which sets on the vat walls to provide a closed system. Since only nominal pressures are involved, no special seals are needed.

To minimize fire hazard, an oxygen-poor, $CO_2$ rich atmosphere is maintained under the hood. This is accomplished by use of an oxygen analyzer 44 (which reads oxygen concentration) and one or more appropriate controls and controlled valves 46 which employ suitable instrumentation, (control 46a), to inject $CO_2$ in response to signals from the oxygen analyzer 44. The vacuum pump 24 continuously draws the gas from the hood through the cake then through the receiver and discharges it back to the hood. In this way, the under-hood environment is kept rich in $CO_2$ and only periodic $CO_2$ make up is needed.

Figure 2:
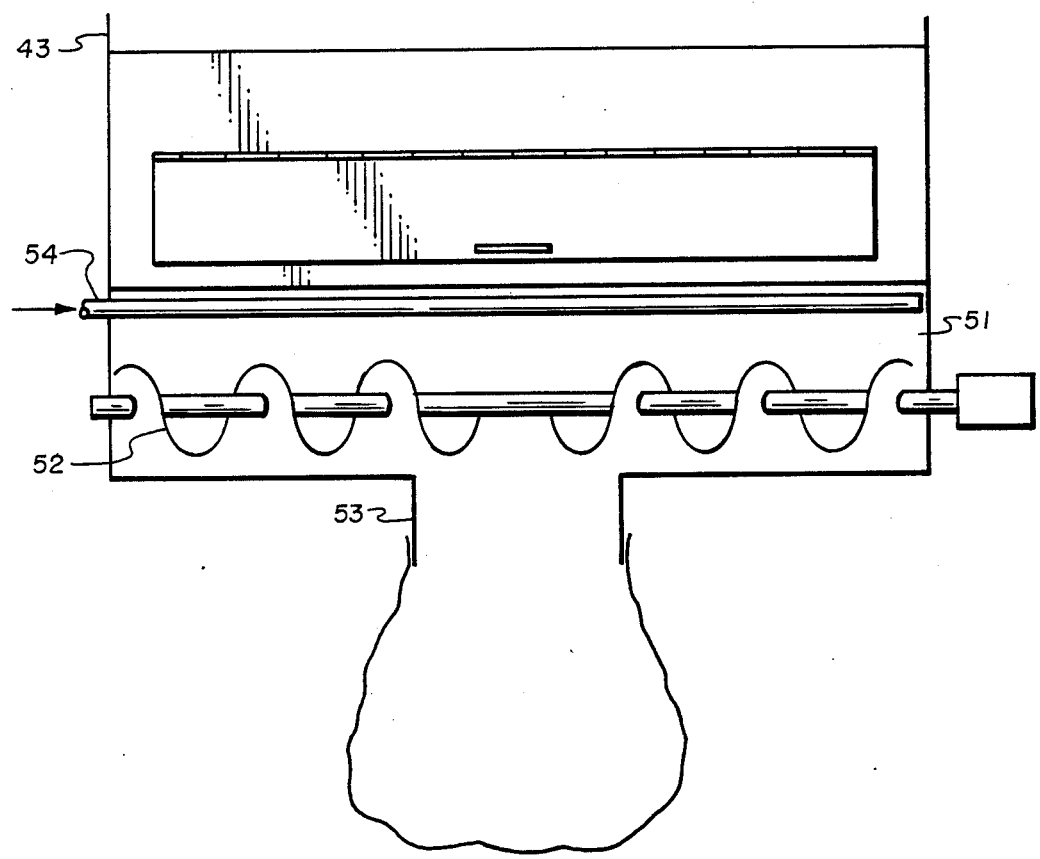
FIG. 2 is an enlarged diagramatic partial front view of a filter suitable for use in the system illustrated in FIG. 1. It is taken in the plane of line 2—2 of FIG. 3 looking in the direction of the arrows 2.
Figure 3:
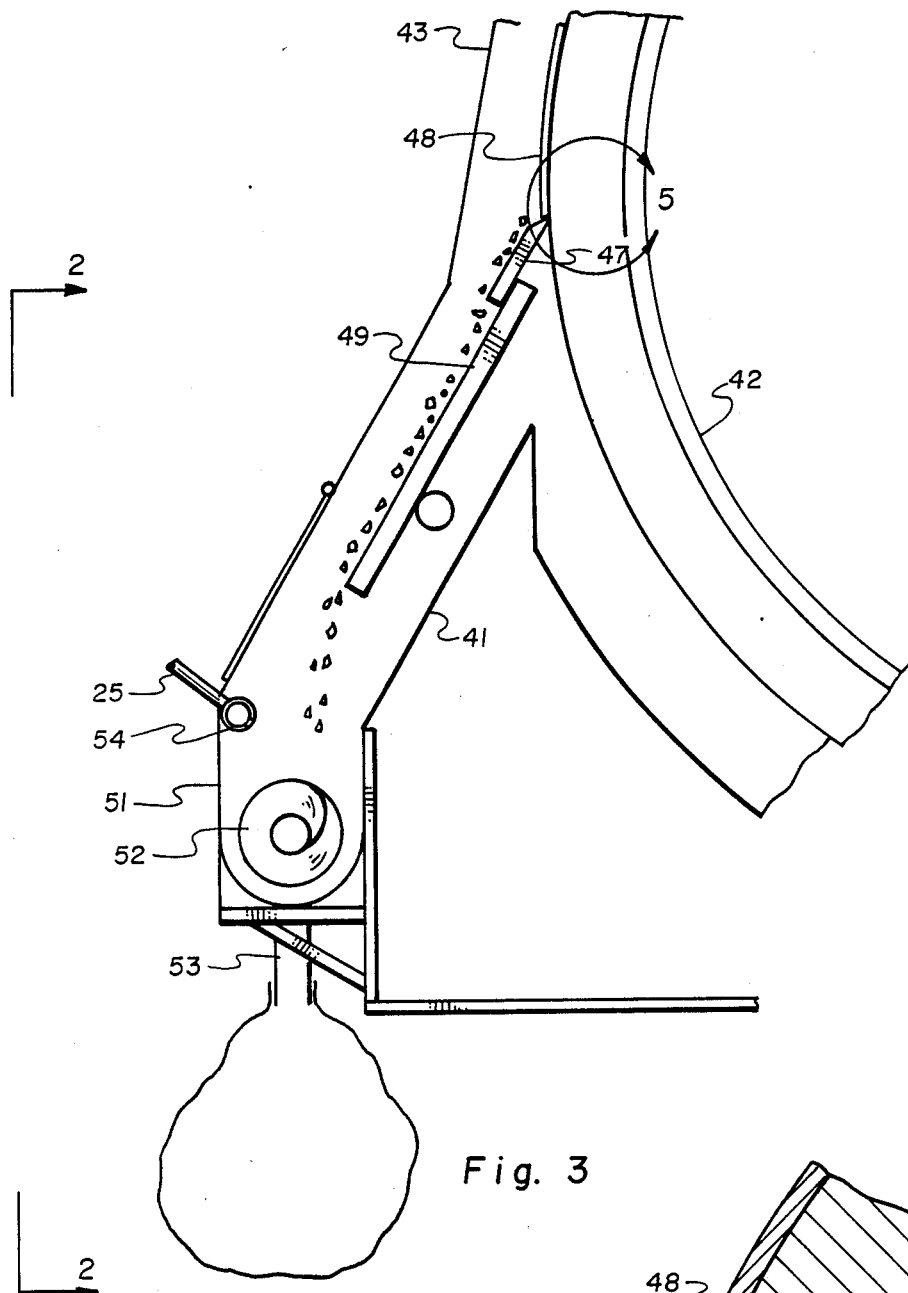
FIG. 3 is an end view of the filter illustrated in FIG. 2.
Figure 5:
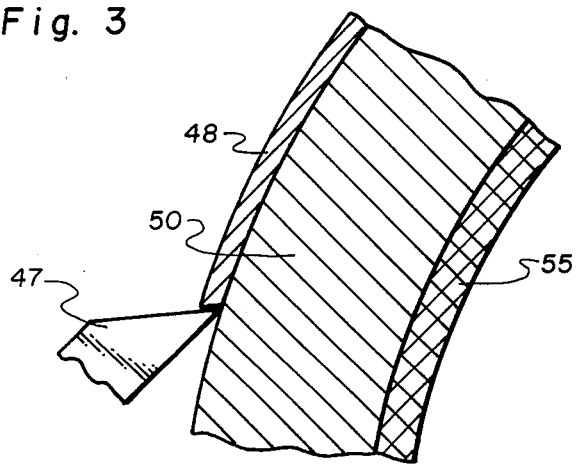
FIG. 5 is an enlargment of the portion of FIG. 3 enclosed in the circle 5 thereof. In the drawing, hatching of the precoat bed is to illustrate that there are different layers, rather than to identify the materials.

FIG. 2 is a simple line sketch taken as facing the front or discharge side of the filter 20 of FI 1. It should be considered with FIG. 3 which is a simple sketch taken at one end of FIG. 2.

The views show a vat 41 in which is journalled for rotation a hollow drum 42 which has a perforated surface on which a cake is formed in usual manner. The precoat cake includes a heel portion 55 overlain by a mixed bed 50 on which a filter cake 48 is formed. The cake surface is continually scraped as it rotates past a sharp edge of an advancing scraper blade 47. Cake material 48 is diverted by a suitable deflector 49 into a trough 51 in which is mounted for rotation a double acting screw 52 that propels the cake to a central discharge chute 53 whence it falls into a disposable bag or other receptacle. For safety reasons it is necessary to maintain an oxygen-poor atmosphere for the cake solids 48 which are hot, burnable, oil soaked solids. The $CO_2$ or other inert gas for this purpose is introduced into the top of the trough 51 via the conduit 25 from the vacuum pump and a perforated manifold 54. Since a vacuum exists at the drum surface, the $CO_2$ gas recycled from the vacuum pump is pulled over and through the cake. As is shown in FIG. 1, the vacuum pump discharge may be injected into the upper zone of the hood 43; and $CO_2$ may also be injected at that location. As an emergency safety precaution, a suitably valved conduit is provided to introduce concentrated inert gas into the hood and conduit. If the gas is $CO_2$, it may be injected in liquid form. Inert gas for normal make up can also be introduced by the same valve.

It is important that all of the mixture of oil and particulates discharged from the cooker be comminuted before filtration. This is necessary to insure that substantially all particulates larger than 170 microns are reduced. If this is not done, filtration cannot be accomplished on any practicable rate or cost basis.

Figure 4:
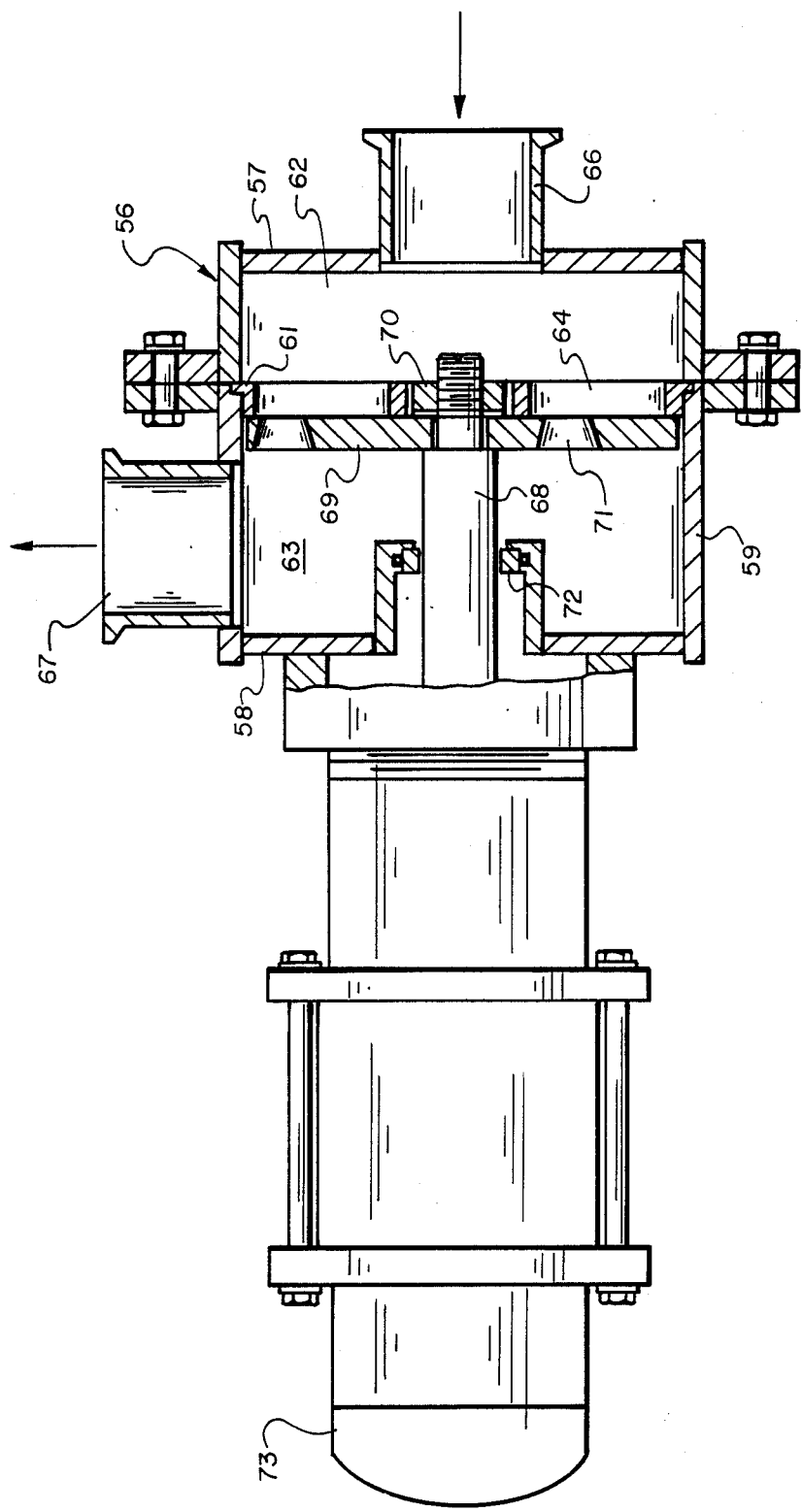
FIG. 4 is a side sectional view of the comminutor employed in the preferred embodiment of the invention.

Comminuting or size reduction is accomplished by the mechanism illustrated in FIG. 4 which comprises a closed relatively shallow cylindrical housing 56 formed from opposite flat ends 57 and 58 joined in spaced apart relationship by a curved side wall 59. The housing is divided internally by a transverse wall 61 to define an inlet chamber 62 and an outlet chamber 63. A plurality of ports 64 in the wall 61 provide communication between the chambers and are a functional part of the size reduction function. A central inlet 66 is located in the end wall 57 of the inlet chamber and a peripheral outlet 67 is located on the side wall 59 in the outlet chamber.

A central rotatable shaft 68 extends through the end wall 58 of the outlet chamber, then axially through the chamber and the interior divider wall 61. A circular rotor 69 is fixed to the end of the shaft 68 inside the inlet chamber and in face-to-face relationship with the internal wall 61. The rotor has ports 71 therethrough located to intermittently register with the ports 64 in the fixed wall 61. The shaft is journalled in a suitable bearing 72 in the end wall 58 and is connected to a suitable hydraulic motor 73 by which the shaft is driven. The hydraulic motor 73 is driven by hydraulic fluid entering and leaving the hydraulic motor through conventional conduits and control valves not shown but which may be of any appropriate design and construction. In operation, the rotor 69 rotates at a rpm of about 1000. This opens and closes the ports 64 and 71 rapidly so their edges shear the particulates as they move past. This is the principal size reduction although some may occur between the facing plates. The oil-solids mix enters through the inlet 66 into the inlet chamber 62 thence through the ports 64 and 71, whereby size reduction occurs, then flows through the outlet chamber 63 and peripheral outlet 67 to the pump 14 and conduit 15 to the dirty oil storage tank 16.

The size consist attained by comminution will be controlled, inter alia, by the flow rate, rpm of the rotor and spacing between the facing rotor and wall. In general, a set up that yields a product that is 100% minus 40–80 U.S. screen mesh (42 mm –177 mm) is satisfactory. The material is easy to chop since it comprises food bits and droppings from the breading and batter. If the coarse particulates are not comminuted, the fines in the oil quickly blind the filter bed. This is probably due to the fact that the medium sized solids resulting from comminution act as a filter aid to enable filtration of the fines. Moreover, if not comminuted, the coarse solids avoid filtration and drop to the bottom of the filter vat where they accumulate as previously described until the vat is drained all the while breaking down into additional free fatty acid.

The various components used in the system are, except for the comminutor, standard, commercially available items. The comminutor illustrated in FIG. 4 was specially developed for this process.

The filter may be any suitable type so long as it is capable of forming and holding a precoat cake, effecting continuous cake removal such as by an advancing blade and of being operated while protected by a hood. A filter of this type as supplied by Westech Engineering Company of Salt Lake City, Utah was used in the example hereinafter described. It had a drum 3' diameter by 4' long.

The invention was tested in full scale operation used to deep fry chicken parts preparatory to freezing for resale.

The system used a gas-heated 500 gallon cooker. Food grade vegetable oil was used. The filter was a singe cell rotary drum. It was hooded to function as described above.

Basic precoat material was diatamaceous earth marketed by Manville under the trade name Celite; the fatty acid adsorbent was a synthetic calcium silicate marketed by Manville under the name Silasorb.

For color removal a synthetic magnesium silicate as marketed by Manville under the name T-21 was used.

The comminutor was essentially as shown in FIG. 4 with the facing plates spaced apart 0.003"0.006". Motor speed was 1000–1750 and pump rate of oil from cooker was 15–30 gpm, but averaged about 20 gpm.

On start up, an initial bed was formed from fresh heated (300° F.+) oil and pure diatamaceous earth (DE). The bed was 2½" deep. Oil in the system was maintained in the 300° F.–380° F. range. Vacuum on the filter was 20" Hg.

$CO_2$ was injected under the hood until the oxygen analyzers showed an oxygen concentration below six percent.

The free fatty acid content of the oil was continuously monitored. After some time, when the free fatty acid content reached 0.60% and the rate of acid increase called for control measures, a slurry of hot clarified oil, diatamaceous earth and free fatty acid adsorbent was prepared in the mix tank. The eventual mix used 17% acid adsorbent and the balance diatamaceous earth. This was added onto the existing filter bed heel to a final depth of 2 inches. Filtration was then resumed.

The free fatty acid content of the oil slowly dropped until it eventually leveled out at 0.40%. After 18 hours the entire precoat bed was replaced. The new bed comprised a ¼" sealing heel of pure diatamaceous earth overlain by a 2 to 2½ mixed bed containing about 85% diatamaceous earth and 15% Silasorb.

The amount of adsorbent will be kept to the minimum needed to do the work. It is expensive. Also, it's fineness reduces filtration rate. Keeping it below 25% has been found satisfactory.

The operation was established as continuous. The only makeup oil added to the system was to replace the oil physically lost with the product and the cake solids wasted from the filter.

In an actual prior system where some coarse solids removal was conducted, the oil was recirculated until the free fatty acid exceeded acceptable limits at which point the oil was discarded. The loss rate from a single 500 gallon cooker was from 500 to 1,000 gallons of oil per day. This generated a daily loss of from $740 to $1,480. In contrast with our new system, scrap oil was eliminated, but at a daily cost of precoat and adsorbent of only $100. Thus, the daily savings per 500 gallon cooker is between $690 and $1,380. The figures reflect only the savings in oil replacement. Additional savings are achieved because labor is no longer needed to handle large quantities of hot oil and very wet hot solids.

Also, fuel savings are considerable because each day there are from 500 to 1,000 fewer gallons of oil to heat.

Having thus described our invention that which we desire to protect by Letters Patent is set forth in the claims.

What is claimed:

1. The continuous method for deep-oil cooking of food comprising the steps of establishing and maintaining a bath of cooking oil at a temperature in the range from 350° F. to 380° F., continuously submerging food in said bath for cooking while removing a quantity of cooked food therefrom, continuously removing from said bath a mixture of oil and particulates said particulates being derived from food materials and including particles larger than about 170 microns in diameter, subjecting said particulates to comminution to effect size reduction thereof to a degree whereat substantially all of said particulates are less than about 170 microns in diameter, separating said particulates from said mixture by filtration on a pressure differential precoat filter of the type employing as a filter media a bed of finely divided material to yield a cake of particulates and a filtrate of particulates-free oil, and maintaining said oil bath as a substantially constant volume but everchanging bath by establishing a predetermined volume for said bath then continuously supplying particulates-free oil thereto at a rate to maintain said predetermined volume at least some of said particulates-free oil supplied to said bath being filtrate derived from filtration of said mixture of oil and particulates.

2. The method according to claim 1 in which said particulates-free oil contains free fatty acid and is contacted with a finely divided free fatty acid adsorbent material by mixing and stirring said adsorbent material in said particulates-free oil thereby to effect removal of free fatty acid from the latter.

3. The method according to claim 1 in which said mixture of oil and particulates contains free fatty acid, said bed of filter media comprises an admixture of at least 75% of a basic precoat filter material and up to 25% of relatively finer adsorbent material adapted to adsorb free fatty acid overlying a sealing heel comprised substantially entirely of basic precoat filter material, and filtration is effected by drawing said oil sequentially through said precoat bed and sealing heel.

4. The method according to claim 3 in which a predetermined content of free fatty acid in said oil bath is established, said free fatty acid content of said oil is monitored andj the rate of withdrawal from said bath of said mixture of oil and particulates and its subsequent filtration is adjusted to maintain said free fatty acid content of said oil at about said predetermined content.

* * * * *